(12) United States Patent
Tyrer

(10) Patent No.: US 6,439,637 B1
(45) Date of Patent: Aug. 27, 2002

(54) GOLF CART COVER

(76) Inventor: Stephen Edward Tyrer, 147 Taft Crescent, Centerport, NY (US) 11721

(*) Notice: Subject to any disclaimer, the term of this patent is extended or adjusted under 35 U.S.C. 154(b) by 0 days.

(21) Appl. No.: 09/895,930

(22) Filed: Jun. 29, 2001

Related U.S. Application Data

(60) Provisional application No. 60/264,152, filed on Jan. 25, 2001.

(51) Int. Cl.[7] .................................................. B60J 9/00
(52) U.S. Cl. .............................. 296/79; 296/83; 296/145
(58) Field of Search .......................... 296/79, 77.1, 80, 296/83, 96.2, 145

(56) References Cited

U.S. PATENT DOCUMENTS

| | | | |
|---|---|---|---|
| 1,242,108 A | * 10/1917 | Buob, Sr. | 296/145 |
| 1,302,500 A | * 5/1919 | Blomberg | 296/145 |
| 1,527,668 A | * 2/1925 | Brunner | 296/145 |
| 3,709,553 A | * 1/1973 | Churchill et al. | 296/79 X |
| 4,013,315 A | * 3/1977 | West | 296/83 |
| 5,217,275 A | 6/1993 | Ridge | |
| 5,259,656 A | 11/1993 | Carroll | |
| 5,388,881 A | * 2/1995 | Spencer et al. | 296/79 X |
| 5,788,317 A | 8/1998 | Nation | |
| 5,975,615 A | 11/1999 | Showalter | |

* cited by examiner

Primary Examiner—Dennis H. Pedder
(74) Attorney, Agent, or Firm—Michael T. York

(57) ABSTRACT

A cover for a golf cart, the golf cart having a cart top and a passenger compartment. The cover having at least a top portion overlaying the golf cart's top, a left side portion, a right side portion and a front portion. The left and right side portions and the front portion substantially cover the openings of the passenger compartment on the golf cart to protect the occupants inside of the cart from poor weather conditions. The front portion of the cover includes a retractable windshield made from a flexible transparent material. The windshield can be retracted from the front portion of the cover by rolling it to at least one side.

32 Claims, 8 Drawing Sheets

GOLF CART COVER

CROSS-REFERENCE TO RELATED APPLICATIONS

This application claims the priority to U.S. Provisional Patent Application No. 60/264,152, filed Jan. 25, 2001, and is herein incorporated by reference in its entirety.

FIELD OF THE INVENTION

This invention relates generally to the field of soft golf cart covers, specifically to an improved cover that protects the passengers from rain.

DESCRIPTION OF THE RELATED ART

Golf cart covers are utilized today to protect the occupants of the cart from adverse weather conditions and insects. The covers generally protect the front, sides and rear of the cart by covering the openings of the cart with panels made of vinyl, cloth or other similar materials. Golf carts typically have hard top covers to protect the occupants from the sunlight. Golf cart covers generally attach to or are supported by the top of the cart and have the side panels of the cover secured to the body of the cart.

Many golf carts have permanent hard front windshields that attach to a windshield frame that generally supports the front of the hard top on the cart. Carts with a permanent windshield do not need to have a front panel on the soft cover to protect the occupants from rain. In fact, having the front soft panel overlay the permanent windshield hinders the ability to see clearly through the front windshield of the cart. Therefore, it is desirable not to overlay the permanent windshield with a soft transparent panel from the soft cover. To accommodate carts with permanent windshields, many golf cart soft covers do not have front transparent panels.

One issue that golf cart soft cover manufacturers have today is making a cover versatile so that it may be used with carts that have permanent windshields and other carts that do not have windshields. A cover that would conveniently work for both types of carts is desirable since it appeals to customers who own a fleet of carts, some having permanent windshields and some without. In addition, it is less expensive to manufacture and warehouse one type of cover rather than two since the covers can be manufactured in higher volumes and stored in smaller quantities. In order to fulfill the need to have a versatile soft cover, there have been several covers patented that allow the front transparent panel to be folded up and secured when used with a cart having a permanent windshield. However, the front panel is relatively large and when rolled up forms a rather large roll that tends to flap around in the wind, collects rain, leafs, bird droppings and other debris. Additionally, these types of roll up front panel covers are unsightly.

Another challenge that golf cart soft cover manufacturers face is preventing the wind and rain from penetrating through the space between the edge of the vertical extending frame members supporting the front of the cart's hard top and the side panels of the soft cover when the front panel is removed or rolled up. The wind and rain tend to cause the front edges of the side panel to flap or flare outward allowing rain into the passenger compartment. To avoid this, covers have been developed that require the front of the side panels to attach to the frame supporting the front of the top. However, this requires additional attachment mechanisms making the cover more expensive and cumbersome to remove. In addition, the cover must be specifically designed for the type of cart it will be used on to ensure that the front edges of the side panels can be securely connected to the cart's front frame. This is due to the wide variety of makes and models of carts that currently exist in the golf market. Many of these carts have different frame designs depending on the cart's manufacturer and model year. This makes the task of creating a soft cover that will provide good water protection for the passengers when the front panel is rolled up a challenging endeavor.

U.S. Pat. No. 5,975,615 to Showalter describes a soft cover bracket that enables the front edges of the side panels of a soft cover to be connected to the frame supporting the front of the cart top. In one embodiment, the bracket also supports a hard windshield. As can be seen in this patent, considerable expense is added to include these brackets to ensure that the front edge of the side panels do not flap in the wind and rain allowing rain into the passenger compartment of the cart. It is also clear that the bracket of the Showalter patent would not fit on any model of cart, requiring different brackets to be designed for different carts.

U.S. Pat. No. 5,788,317 to Nation describes a soft golf cart cover having a plurality of panels, each panel having an inner and outer layer. The cover described in this patent can have a front panel, however, the front panel cannot be rolled up or removed. Therefore, the cover described in the Nation patent would hinder the ability to clearly see through the permanent windshield and the layer of transparent soft cover material overlaying it.

U.S. Pat. No. 5,217,275 to Ridge describes a soft golf cart cover that has panels enclosing the passenger and club storage areas of the cart. A center vertical zipper in the rear panel is utilized in the Ridge patent to allow access to the golf clubs. However, there is no mention in the patent of using a zipper on the front windshield to allow it to be rolled or folded out of the way. Therefore, the cover described in the Ridge patent would hinder the ability to clearly see through the permanent windshield and the layer of transparent soft cover material overlaying it.

U.S. Pat. No. 4,013,315 to West describes a soft golf cart cover made up of a plurality of individual panels that attach to the cart's hard top. The panels may be connected to each other using ties to secure them together. It is conceivable that individual panels could be removed or folded up when not in use. However, if the front panel is rolled up, it will form a rather large cumbersome roll near the front edge of the cart. This roll will tend to collect rain, debris and bird droppings. Additionally, the front edges of the side panels require additional attachment to the frame of the cart. The patent describes ties that could be utilized to attach the front edge of the side panels to the edge of the cart's frame. However, this would form a rather poor seal and would require more cumbersome assembly and disassembly steps. Therefore, wind and rain would enter into the passenger compartment and the cover would be burdensome to install and remove due to all the tying required. In addition, the panel would need to be sized correctly and the ties positioned so that they would be in the right location to attach to the cart's frame. This would require different panel designs and tie positions for different makes and models of carts.

U.S Pat. No. 5,259,656 to Carroll describes a soft golf cart cover made up of a plurality of individual panels that may be rolled up and stored. However, the cover described in the Carroll patent would form a rather poor seal with the front edge of the side panels if the front panel was rolled up. Therefore, it would allow wind and rain to enter into the passenger compartment. It is also necessary to attach the front edge of the side panels to the cart's frame to avoid having the edges flap in the wind and allow rain to enter the passenger compartment. This attachment would require an attachment mechanism and more cumbersome assembly and disassembly steps. The cover of this patent would require different cover designs for different makes and models of carts to ensure that the front edges of the side panels could be attached to the cart's frame.

Therefore, a foldable golf cart cover that can be used with almost any make or model of cart, with or without a permanent windshield, without hindering the vision of the passengers and that forms versatile water blocking shields between the front edges of the side panels and the cart's frame is desired. It would also be beneficial if a golf cart cover that had these desired features be esthetically pleasing, portable and not allow the side panels to flap in the wind when the front panel is rolled up.

BRIEF SUMMARY OF THE INVENTION

The present invention provides an improved golf cart cover for protecting the occupants in a golf cart against harsh weather conditions or heavy bug concentrations. The cover is designed to be versatile, so that the same design will fit a wide variety of golf cart makes and models including carts with permanent hard windshields and those without windshields. The cover of this present invention would additionally provide a water and wind-blocking shield at the front edges of the side panels preventing them from entering the passenger compartment. In one preferred embodiment of this invention, the cover utilizes a central windshield zipper to allow the flexible windshield to be rolled back out of the way when the cover is used on a cart with an existing windshield. In like manner, the flexible windshield can be rolled flat and zipped together in the center to accommodate carts that do not have a windshield when the player desires windshield protection. In a second preferred embodiment, the zipper could be located on either side of the center of the windshield or at the extreme edges. The zipper in either embodiment may be replaced by another fastening means.

OBJECTS AND ADVANTAGES OF INVENTION

Accordingly, several objects and advantages of the present invention are:

(a) to provide a golf cart cover that fits on a wide variety of different golf cart types without the need for modification;

(b) to provide a golf cart cover that forms a water and wind blocking shield at the front edge of each side panel when the front panel is rolled toward the sides without the need to attach the side panels to the cart's frame;

(c) to provide a golf cart cover that can be utilized on carts with and without permanent hard windshields without overlaying an existing hard windshield with a flexible windshield causing reduced or blurred vision;

(d) to provide a golf cart cover that can be easily installed on a wide variety of carts without the need for attaching the front edges of the side panels to the frame of the cart, making the golf cart faster to install and remove;

(e) to provide a golf cart cover that prevents the front edges of the side panels from flapping in the wind when the front panel is rolled up, without having to attach the front edges of the side panel to the frame of the cart;

(f) to provide a golf cart cover that is esthetically pleasing;

(g) to provide a golf cart cover that allows the front windshield panel to be rolled to the side or sides of the cart forming vertical rolls that do not trap leafs, bird droppings and other debris as easily as horizontal rolls; and (h) to provide a golf cart cover that is robust and durable.

BRIEF DESCRIPTION OF SEVERAL VIEWS OF THE DRAWINGS

These and other advantages of the present invention will become more fully apparent as the following description is read in conjunction with the drawings, wherein.

DETAILED DESCRIPTION OF THE PREFERRED EMBODIMENTS

Figure 1:
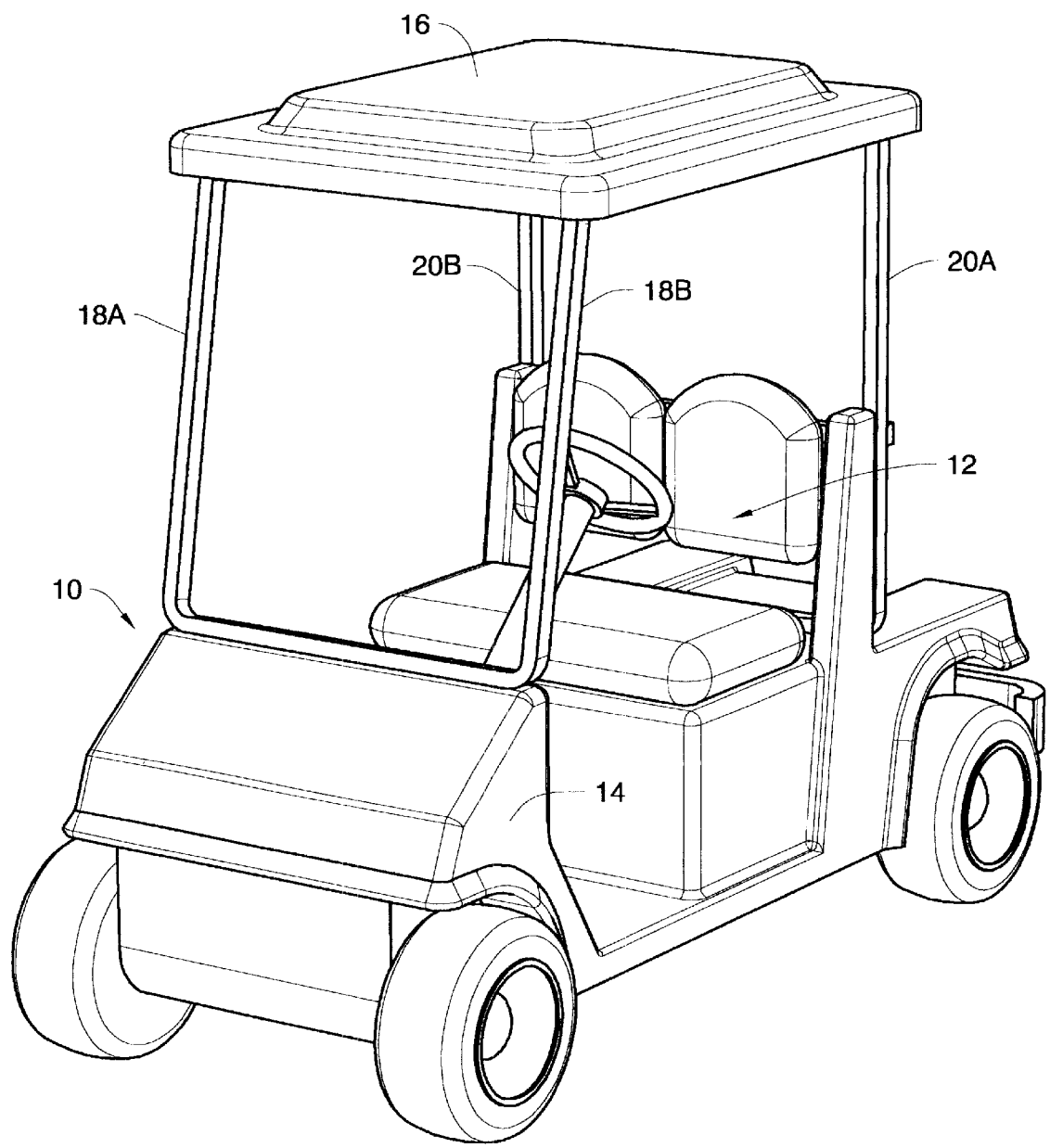
FIG. 1 is a perspective view of a golf cart in which an embodiment of the present invention may be used.

The present invention will now be described in detail. Referring now to FIG. 1, the present invention is used on a motorized golf cart 10, covering the openings of the cart to protect the passengers from rainfall. Cart 10 has a passenger compartment 12 for sitting passengers, a cart body 14, a cart top 16, vertically extending and laterally spaced apart front and rear frame members 18A, 18B and 20A, 20B respectively, that support cart top 16.

Figure 2:
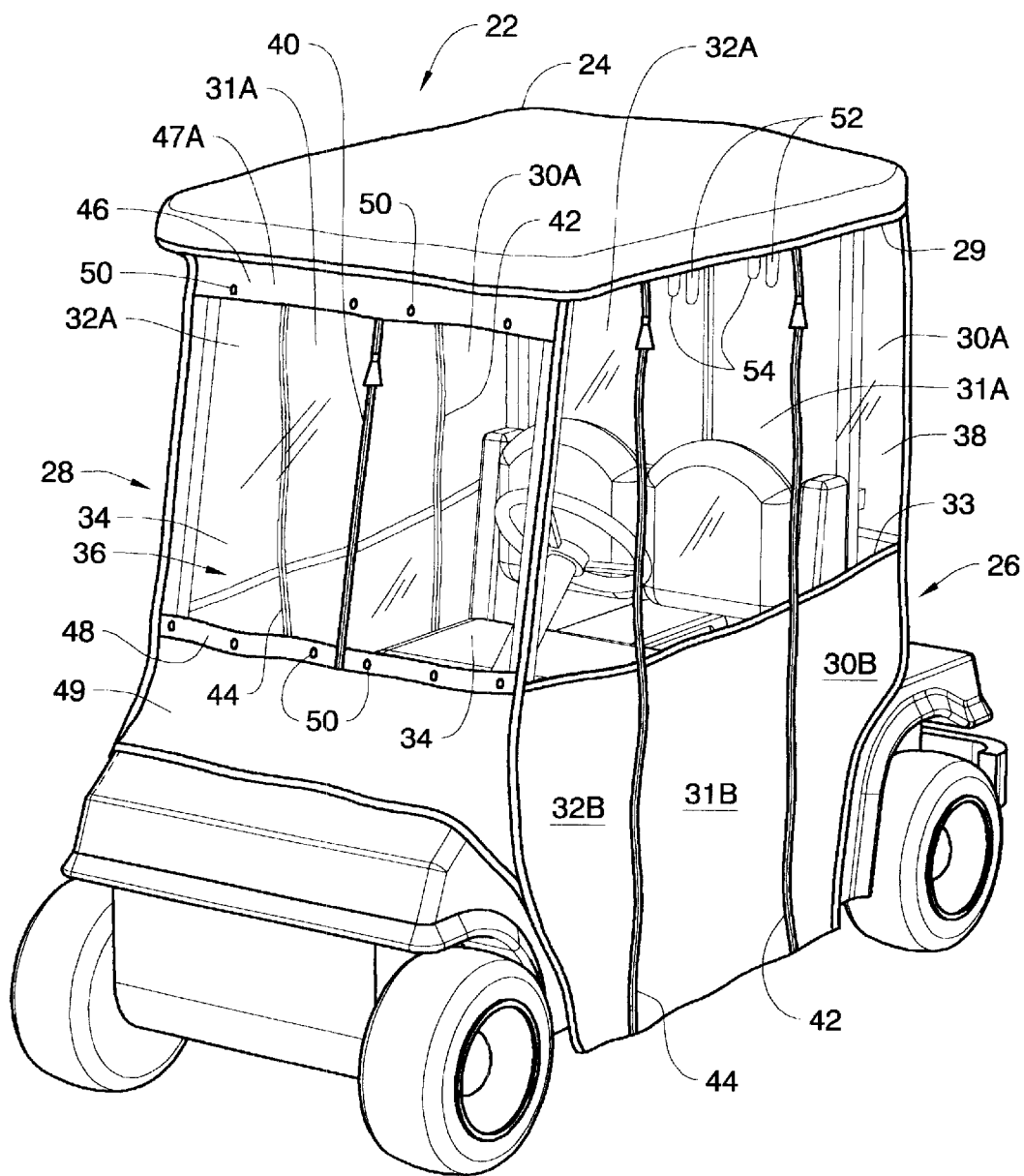
FIG. 2 is a perspective view of a golf cart with an embodiment of the present invention covering the cart with the front flexible windshield zipped closed.

Referring now to FIG. 2, a cover 22 may be installed over the golf cart, as shown in the figure. The cover includes a rectangular cover top portion 24 that rests on cart top 16, a right side portion 26 and a left side portion 28 having top edges 29 that are stitched to and are suspended from cover top portion 24, a front portion 36 and a rear portion 38 that are both stitched to and suspended from cover top portion 24. The rear portion covers the rear of the golf cart protecting stored items on the back of the cart. Alternatively, the right and left side portions and front and rear portions could be attached to the cover top portion 24 using plastic welding, mechanically interlocking plastic strips, hook and loop fasteners, snaps or other connecting means. Cover top portion 24 is made from a water resistant material, as for example vinyl, nylon or canvas. Rear portion 38 is made from a transparent material like clear vinyl, so that the player, when standing behind the cart, can see what is stored in the back of the cart. Both the left and right side portions are divided into three parts by a vertical front side zipper 44 and a vertical rear side zipper 42. The front and rear side zippers permit access to passenger compartment 12 on either side by unzipping the front and rear side zippers upwardly toward cover top portion 24 and rolling a middle lower panel 31B and a middle upper panel 31A upward in one continuous roll. The rolled middle upper and middle lower panels are held up against top edge 29 by fastening hook straps 52 to loop straps 54 around the continuous roll of the middle, upper and lower panels. Straps, snaps, ties or other securing methods could be employed instead of the hook and loop fastener strips to secure rolled middle upper and lower panels. Both the right and left side portions of cover 22 have front, middle and rear upper panels 32A,. 31A, and 30A respectively, that are made of a thin, flexible transparent material, as for example clear vinyl, to enable passengers in cart 10 to see outward from the passenger compartment. Both the right and left side portions of cover 22 have front, middle and rear lower panels 32B, 31B and 30B respectively, that are made of a rugged water resistant material like nylon, vinyl or canvas. The front, middle and rear lower panels are stitched or otherwise connected to the front, middle and rear upper panels along a middle seam 33. Alternatively, the left and right side portions could be made of fewer sections, as for example one continuous panel with a center zipper to allow access to the passenger compartment. It should be noted that the front and rear side zippers could also be replaced by hook and loop fastener strips, snaps, mechanically interlocking plastic strips or other fastening means.

Figure 8:
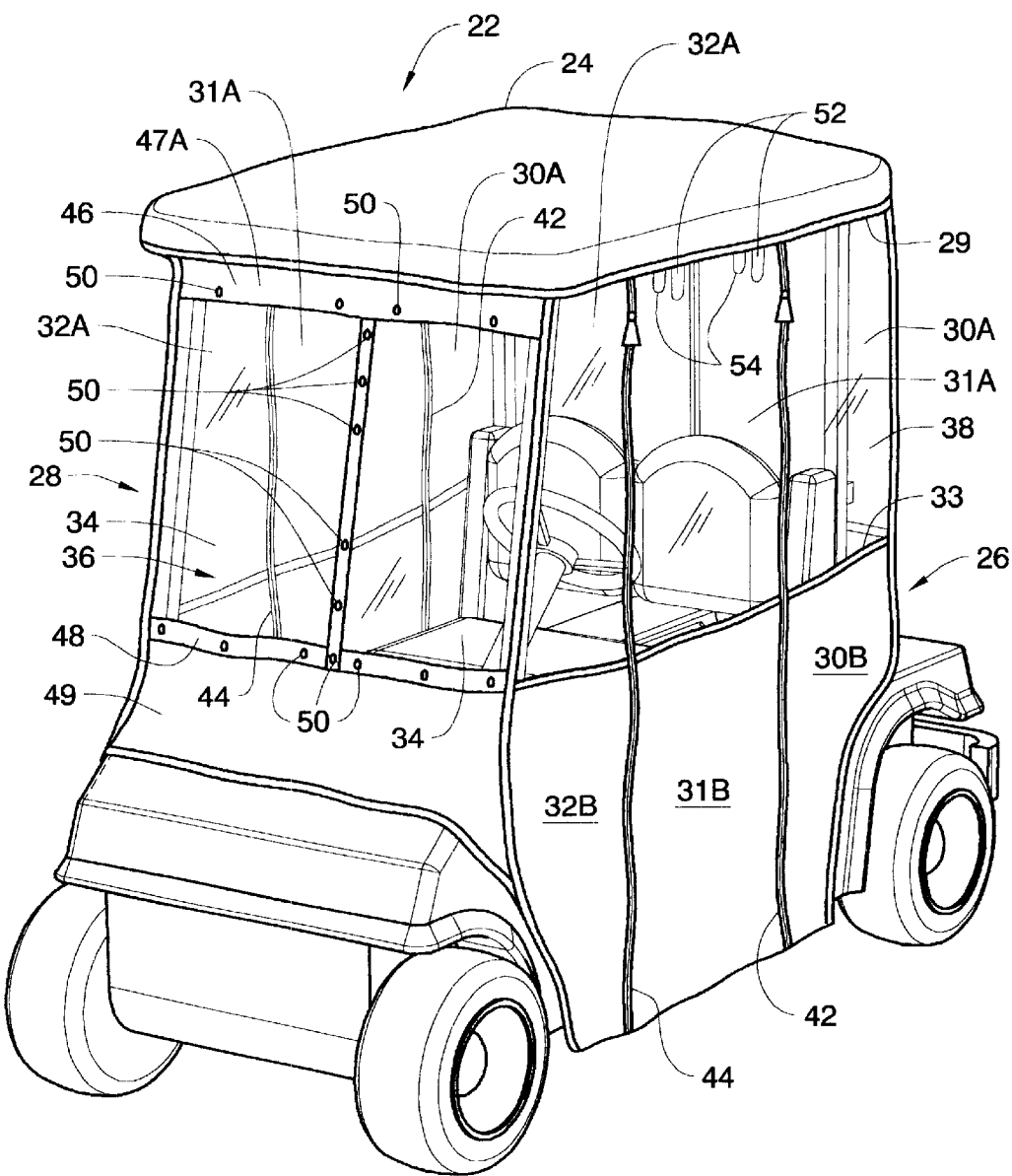
FIG. 8 is a perspective view of an embodiment of the present invention with snap fasteners.

Referring again to FIG. 2, front portion 36 includes rectangular transparent windshield panels 34, a vertical windshield zipper 40 attaching the windshield panels at vertical adjacent edges, a horizontal, rectangular shaped, downwardly opening pocket 46 running across the upper section of front portion 36, a fastener strip 48 containing snaps 50 is sewn across the bottom of windshield panels 34, and a front panel 49 draping across the front of cart 10. Pocket 46, fastener strip 48 and front panel 49 are all made of a water resistant, durable material like vinyl, nylon or canvas. Panel 49 connects the right and left side portions of cover 22 together below the windshield panels and serves as a water-blocking shield. Windshield panels 34 are made of a transparent material like clear vinyl to allow the cart's operator to see out of the cart. Vertical windshield zipper 40 connects the two windshield panels together on the front portion of the cover forming a substantially vertical connection. The windshield zipper is preferably made of steel, however, plastic zippers will also work. Alternatively, the windshield zipper could be replaced by other fastening mechanisms as for example snaps as shown in FIG. 8, hook and loop fastener strips, mechanically interlocking plastic strips or other fastening means. Pocket 46 includes an outer flap 47A and an inner flap 47B, shown in FIG. 3. The depth of the pocket is sized to receive the upper portions of windshield panels 34. Therefore, approximately one to six inches of the top edges of the windshield panels are sandwiched within pocket 46 between outer flap 47A and inner flap 47B. Snaps 50 extending along the top edge of front panel 49 mate with corresponding snaps 50 mounted on fastener strips 48 that are sewn onto the bottom of the windshield panels. In this way, windshield panels 34 can be secured to the front panel to prevent wind from causing the windshield panels to flap while the golf cart is traveling. Snaps 50 are also mounted on pocket 46. Outer flap 47A of the pocket has snaps 50 secured to it and inner flap 47B has the corresponding snaps 50 so that the snaps may be secured together when the windshield panels are rolled to the sides to prevent the inner and outer flaps of pocket 46 from flapping in the wind. These snaps are not mated together when the windshield panels are secured together, as shown in FIGS. 1 and 2. Snaps 50 can be made of steel, however, plastic snaps may also be used. Alternatively, as for example fastener strip 48 could be eliminated with the snaps 50 or other fastening means attached or mounted directly onto the bottom of windshield panels 34. Additionally, other coupling mechanisms may be used to secure the inner flap to the outer flap as for example hook and loop fastener strips.

Referring again to FIGS. 1 and 2, cover 22 is shown in place and front portion 36 has windshield panels 34 connected together using windshield zipper 40. In this way, the two windshield panels makeup a transparent windshield for cart 10 to protect the passengers from adverse weather conditions like rainfall. This is desirable when the cart does not have a permanent windshield of its own, as shown in FIG. 1.

Figure 3A:
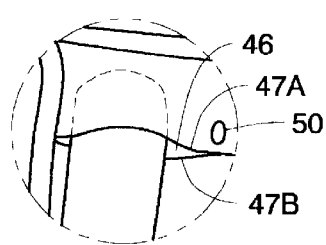
FIG. 3A is an enlarged partial view of the present invention.
Figure 3B:
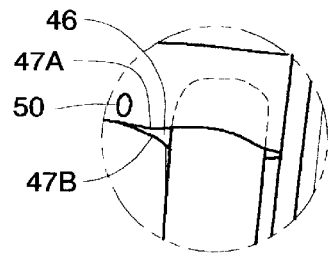
FIG. 3B is an enlarged partial view of the present invention.
Figure 3:
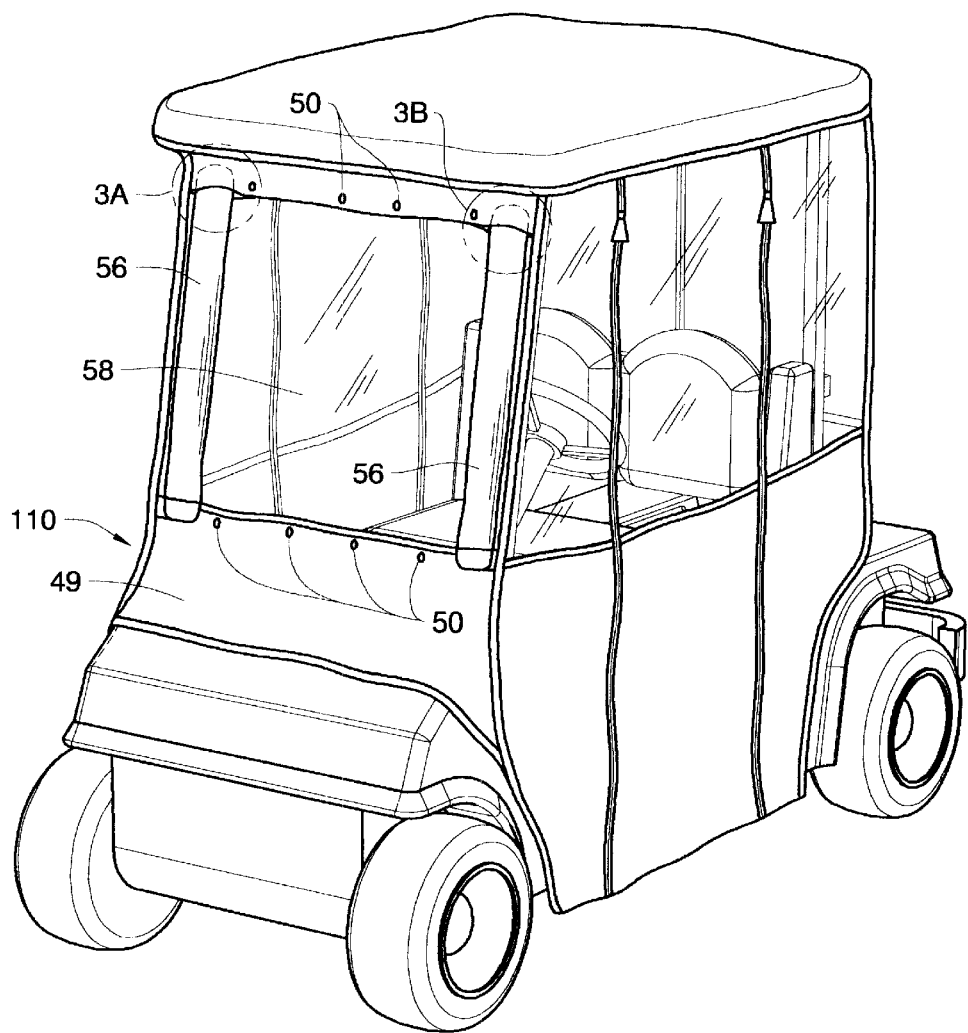
FIG. 3 is a perspective view of a golf cart with an embodiment of the present invention covering the cart with the front flexible windshield rolled open.

Referring now to FIGS. 2 and 3, a golf cart 110 has a permanent cart windshield 58 that is suspended between front frame members 18A and 18B. The permanent windshield is made using a hard, transparent material. Since golf cart 110 is equipped with permanent cart windshield 58, it is undesirable to have flexible windshield panels 34 overlapping the cart's windshield because this will hinder the passenger's vision looking out of the cart. Therefore, in order to accommodate both cart 10 without cart windshield 58 and cart 110 with cart windshield 58, cover 22 utilizes windshield zipper 40 to allow windshield panels 34 to be separated or connected. In the case of golf cart 110 with a permanent windshield, the zipper is unzipped and the windshield panels are rolled to the sides forming rolled windshield panels 56, shown in FIG. 3. In this way, the permanent cart's windshield can be used to protect the passengers from rain coming in the front of cart 110. The cover can be used to protect rain from coming in the back and sides of cart 110 without hindering the vision of the passengers and without the need for two separate cover designs.

Referring now to FIGS. 2 and 3. The windshield panels may be rolled toward the sides of cart 110, rolling up within pocket 46 on the upper edge of the windshield panels and unsnapping snaps 50 on fastener strip 48 on the lower edge of windshield panels 34 as it rolls past each of the snaps. Once the rolled windshield panels are completely rolled to the sides of the front portion of cover 22, as shown in FIG. 3, the outer snaps 50 on pocket 46 are snapped together, preventing rolled windshield panels 56 from unrolling back toward the center of the golf cart. Therefore, the rolled windshield panels are kept in a rolled state by snaps 50 fastening outer flap 47A to inner flap 47B on pocket 46. Rolled windshield panels 56 are shields that block water and wind from entering between the sides of front frame members 18A and 18B that support the permanent windshield and the right and left side portions of cover 22. It is not necessary to connect the front edges of the right and left side portions or the rolled windshield panels to the frame of the golf cart. The rolled windshield panels secured within pocket 46 have sufficient stiffness to prevent them from flapping in the wind. In addition, rolled windshield panels 56 have a sufficient diameter creating a wide water and windshield making it effective regardless of the amount of spatial gap between front frame members 18A and 18B supporting the permanent windshield and the right and left side portions of cover 22. This allows cover 22 to be used on a wide variety of carts having a broad range of frame sizes, windshield sizes, positions and designs.

Cover 22 may be removed from the cart by simply pulling the cover over cart top 16. Once the cover has been removed from the cart, it may be folded up and stored in a storage bag.

Figure 4:
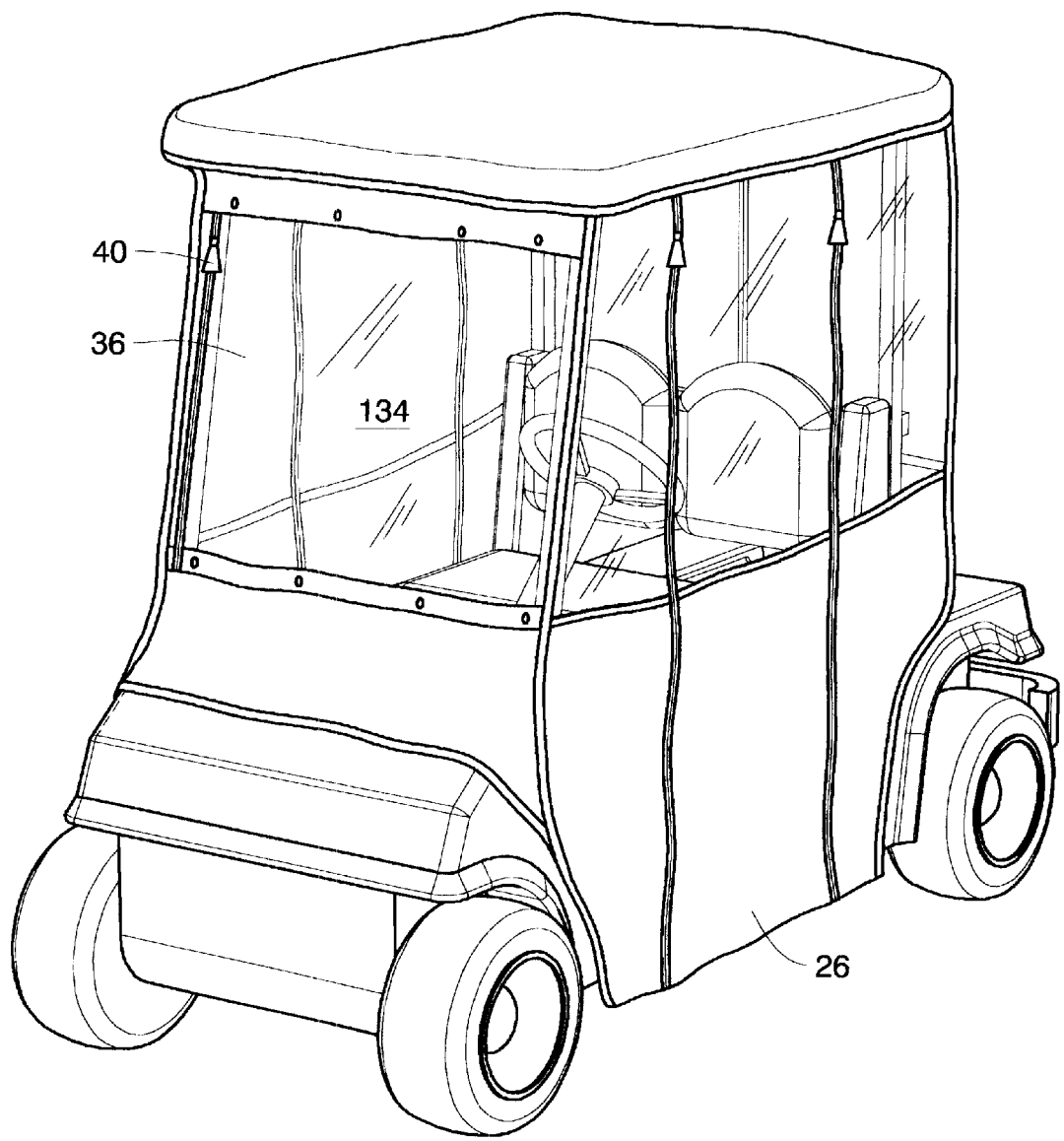
FIG. 4 is a perspective view of a second alternative embodiment of the present invention.

A second embodiment of the present invention is shown in FIG. 4, a windshield zipper 40 is positioned on one side of front portion 36. This eliminates one of the windshield panels leaving an enlarged windshield panel 134. The enlarged windshield panel can be folded out of the way by rolling the enlarged windshield panel toward right side portion 26 of cart 110 in the same manner as described before. Additionally, the rolled, enlarged windshield panel is held in the rolled state in the same manner as previously described in the first embodiment of this invention. Alternatively, windshield zipper 40 could also be replaced by hook and loop fastener strips, snaps, mechanically interlocking plastic strips or other fastening means.

Figure 5:
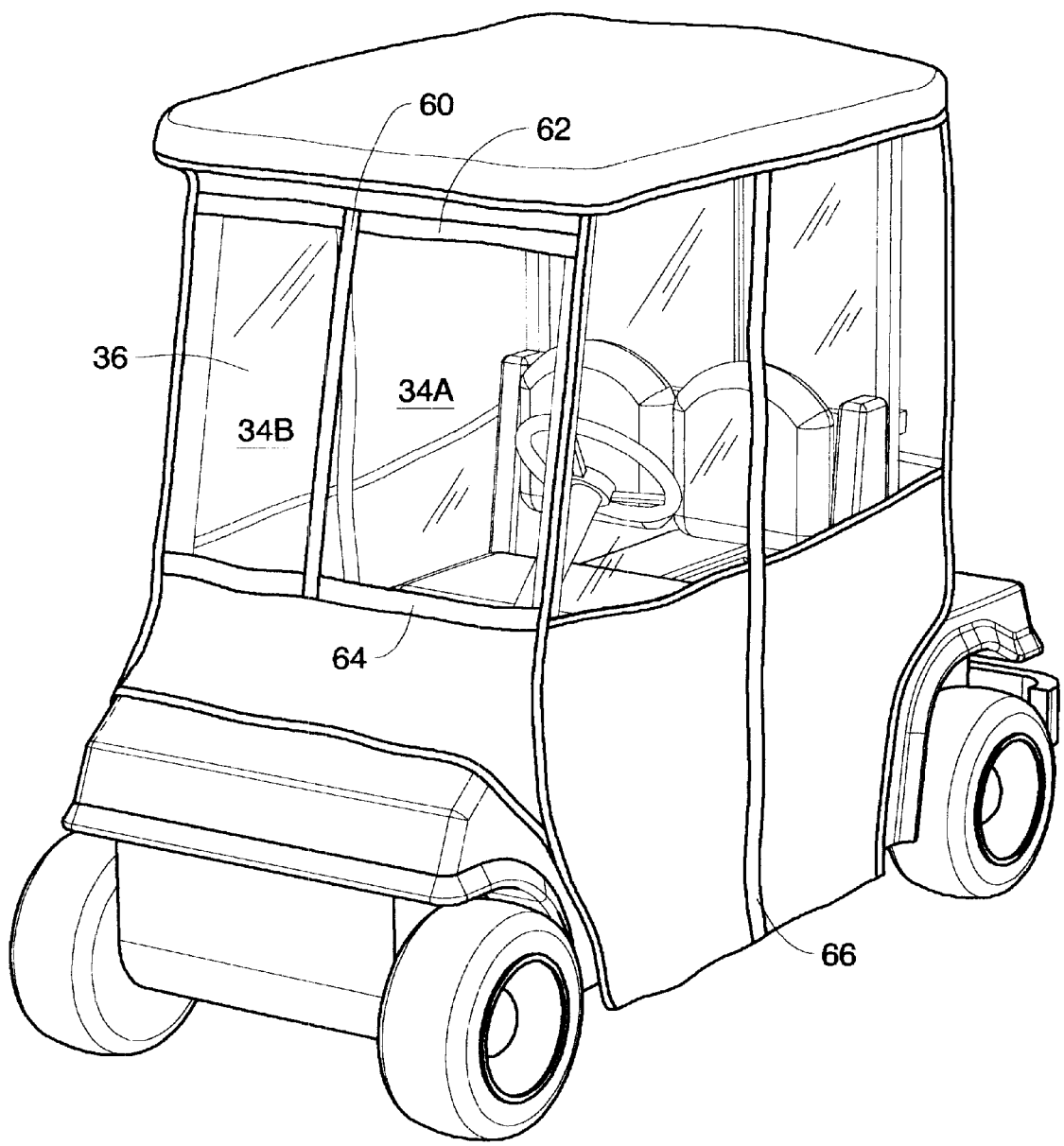
FIG. 5 is a perspective view of a third alternative embodiment of the present invention.

A third embodiment of the present invention is shown in FIG. 5. The center windshield zipper is replaced with a vertical hook and loop fastener strip 60 that is located off center of front portion 36. A driver side windshield panel 34A is slightly larger than a passenger side windshield panel 34B. The vertical hook and loop fastener strip performs the same function as zipper 40 previously described. The vertical hook and loop fastener is located slightly toward the passenger side to improve the driver's vision. Alternatively, the vertical hook and loop fastener could be located in the center of the front portion or located off center toward the driver's side. Additionally, the snaps located above and below the windshield have been replaced with an upper hook and loop fastener strip 62 and a lower hook and loop fastener strip 64. The lower hook and loop fastener strip attaches the bottom edge of the passenger and the driver side windshield panels to front panel 49 preventing them from flapping in the wind while the golf cart is traveling. Upper hook and loop fastener strip 62 performs the same function as the snaps that it replaced, namely, holding the rolled up passenger side and driver side windshield panels in place in the same way the snaps did, shown in FIG. 3, and to attach outer flap 47A to the inner flap 47B. A side panel hook and loop fastener 66 has been employed to replace front and rear side zippers 44 and 42 respectively. Alternatively, the vertical, upper and lower hook and loop fastener strips, could be replaced with snaps, cooperating magnets, interlocking plastic or other connection means.

Figure 6:
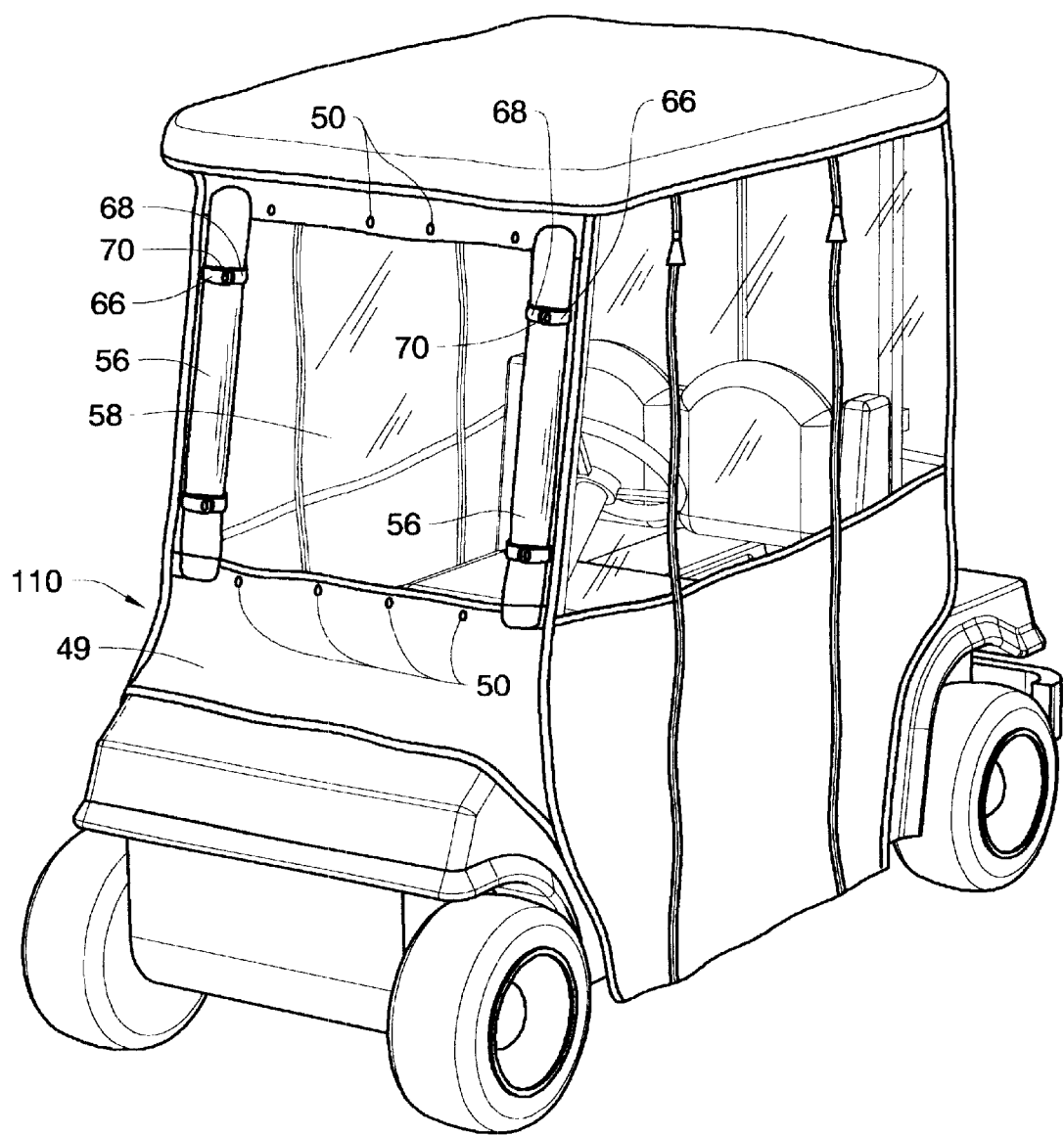
FIG. 6 is a perspective view of a fourth alternative embodiment of the present invention.

A fourth embodiment of the present invention is shown in FIG. 6. Top pocket 46, shown in FIG. 3, has been eliminated. Outer straps 66 mate with inner straps 68 using strap snaps 70. The inner and outer straps cooperate to restrain the rolled windshield panels 56, preventing them from unrolling. Alternatively, the strap snaps could be replaced with hook and loop fasteners, cooperating magnets, interlocking plastic or other connection means. Additionally, either the inner straps or the outer straps could be eliminated and the remaining strap could attach directly to the cover.

Figure 7:
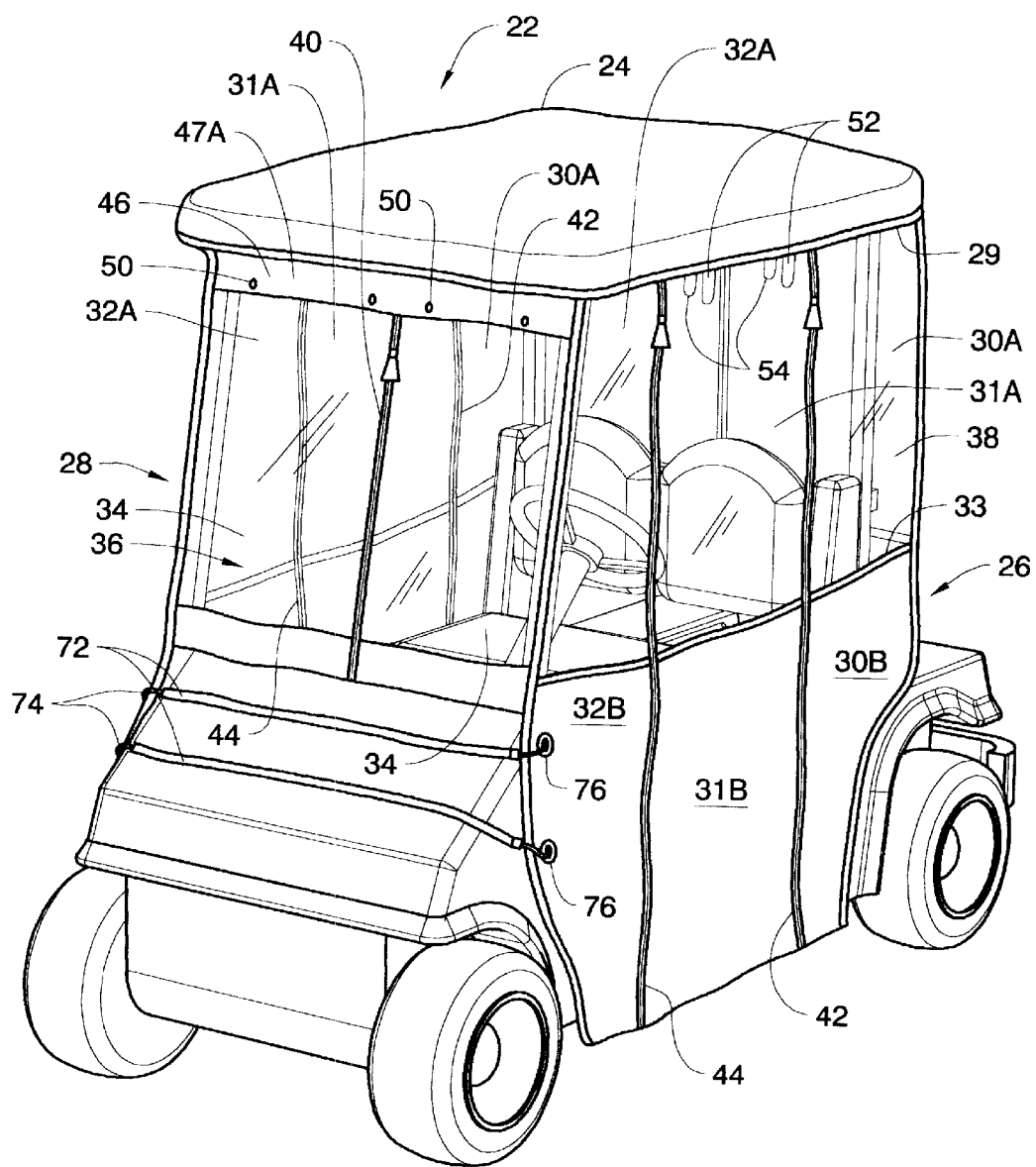
FIG. 7 is a perspective view of a fifth alternative embodiment of the present invention.

A fifth embodiment of the present invention is shown in FIG. 7. Elastic cords 72 replace front panel 49, shown in FIG. 2. The elastic cords have hooks 74 attached at each end that fit into reinforced holes 76 in front lower panels 32B. Elastic cords 72 attach the right and left side portions of cover 22 together across the front of the cart, as shown in FIG. 7. The snaps on the lower edge of windshield panels 34 have been eliminated. Alternatively, one end of the elastic cords could be sewn onto either the left or right side panel eliminating the hooks on one end of the elastic cords. In addition, the hooks could be replaced with hook and loop fasteners, cooperating magnets, interlocking plastic or other detachable connection mechanisms to allow the elastic cords to be attached to the left and right side panels.

CONCLUSIONS, RAMIFICATIONS AND SCOPE OF INVENTION

Although the description above contains many specificities, these should not be construed as limiting the scope of the invention, but as merely providing illustrations of some of the presently preferred embodiments of this invention. For example, the snaps could be replaced by hook and loop fastener strips, magnetic strips or mechanically interlocking plastic on both the fastener strip and the pocket; one of the side zippers could be eliminated allowing the user to separate the side portions and enter the cart; all or some of the zippers mentioned in the description could be replaced by other fastening means, as for example snaps, hook and loop fastener strips, mechanically interlocking plastic or magnetic strips; the cover top portion could be replaced with a top rim of material that rested on the edges of the cart top and did not fully cover the cart's top; the entire cover could be made from a transparent material like vinyl; the rear portion could be eliminated; the stitched seams could be eliminated or replaced with another type of connecting method, as for example snaps, hook and loop fastener strips or welded plastic seams; a rear center zipper or two rear side zippers could be added to the rear portion to allow easy access to clubs and bags stored in the back of the cart, etc.

What is claimed is:

1. A cover for a golf cart, the golf cart having a cart top and a passenger compartment, said cover comprising:

a top portion overlaying the cart top, said top portion is made of a flexible material;

a front portion including at least a driver side windshield panel and a passenger side windshield panel, said windshield panels are made of a flexible transparent material;

a fastening mechanism connecting said windshield panels to each other at substantially vertical adjacent edges;

wherein said fastening mechanism is located in the approximate center of said front portion;

a left side portion; and a right side portion;

wherein said front portion, said left side portion and said right side portion are connected to said top portion and extend downward to at least substantially cover the passenger compartment.

2. A cover according to claim 1, wherein said fastening mechanism is a zipper.

3. A cover according to claim 1, wherein said fastening mechanism is a hook and loop fastener strip.

4. A cover according to claim 1, wherein said fastening mechanism includes a plurality of snap fasteners.

5. A cover for a golf cart, the golf cart having a cart top and a passenger compartment, said cover comprising:

a top portion overlaying the cart top, said top portion is made of a flexible material;

a front portion including at least a driver side windshield panel and a passenger side windshield panel, said windshield panels are made of a flexible transparent material and are each connected to said front portion at least on one edge;

a fastening mechanism connecting said windshield panels to each other at adjacent edges;

wherein said fastening mechanism forms a substantially vertical connection in said front portion and is located in the approximate center of said front portion;

a rear portion;

a left side portion; and a right side portion;

wherein said front portion, said rear portion, said left side portion and said right side portion are connected to said top portion and extend downward from the perimeter of said top portion to at least substantially cover the passenger compartment.

6. A cover according to claim 5, wherein said fastening mechanism is a zipper.

7. A cover according to claim 5, wherein said fastening mechanism is a hook and loop fastener strip.

8. A cover according to claim 5, wherein said fastening mechanism includes a plurality of snap fasteners.

9. A cover for a golf cart, the golf cart having a cart top and a passenger compartment, said cover comprising:
- a top portion overlaying the cart top, said top portion is made of a flexible material;
- a front portion including at least a driver side windshield panel, a passenger side windshield panel and a front panel, said windshield panels are made of a flexible transparent material and are each connected to said front portion at least on one edge, said front panel is made of a flexible material;
- a fastening mechanism connecting said windshield panels to each other at adjacent edges;
- wherein said fastening mechanism forms a substantially vertical connection in said front portion and is located in the approximate center of said front portion;
- a rear portion;
- a left side portion; and
- a right side portion;
- wherein said front portion, said rear portion, said left side portion and said right side portion are made of flexible material and are connected to said top portion and extend downward from the perimeter of said top portion to at least substantially cover the passenger compartment;
- wherein said front panel is connected to said left side portion and said right side portion.

10. A cover according to claim 9, wherein said fastening mechanism is a zipper.

11. A cover according to claim 9, wherein said fastening mechanism is a hook and loop fastener strip.

12. A cover according to claim 9, wherein said fastening mechanism includes a plurality of snap fasteners.

13. A cover for a golf cart, the golf cart having a cart top and a passenger compartment, said cover comprising:
- a top portion overlaying the cart top, said top portion is made of a flexible material;
- a front portion including at least a driver side windshield panel, a passenger side windshield panel, and a downwardly opening elongated pocket, said pocket including an inner flap and an outer flap, said windshield panels are made of a flexible transparent material;
- wherein the upper edges of said windshield panels engage said pocket;
- a coupling mechanism attached to said pocket coupling said inner flap and said outer flap together;
- a fastening mechanism for connecting said windshield panels to each other at adjacent edges;
- wherein said fastening mechanism forms a substantially vertical connection in said front portion and is located in the approximate center of said front portion;
- a left side portion; and
- a right side portion;
- wherein said front portion, said left side portion and said right side portion are connected to said top portion and extend downward to at least substantially cover the passenger compartment,
- whereby said fastening mechanism can be released and said passenger side windshield panel and said driver side windshield panel can be rolled toward the left and right sides of said front portion respectively, rolling up within said pocket, said coupling mechanism can secure said inner flap and said outer flap together preventing said windshield panels from unrolling.

14. A cover according to claim 13, wherein said coupling mechanism includes a plurality of snap fasteners.

15. A cover according to claim 13, wherein said fastening mechanism is a zipper.

16. A cover according to claim 13, wherein said fastening mechanism is a hook and loop fastener strip.

17. A cover according to claim 13, wherein said fastening mechanism includes a plurality of snap fasteners.

18. A cover for a golf cart, the golf cart having a cart top and a passenger compartment, said cover comprising:
- a top portion overlaying the cart top, said top portion is made of a flexible material;
- a front portion including at least a driver side windshield panel and a passenger side windshield panel, said windshield panels are made of a flexible transparent material;
- a fastening mechanism connecting said windshield panels to each other at adjacent edges;
- wherein said fastening mechanism forms a substantially vertical connection in said front portion and is located in the approximate center of said front portion;
- an upper securing mechanism for securing the upper edge of said windshield panels to said front portion;
- a lower securing mechanism for securing the lower edge of said windshield panels to said front portion;
- a left side portion; and
- a right side portion;
- wherein said front portion, said left side portion and said right side portion are connected to said top portion and extend downward to at least substantially cover the passenger compartment.

19. A cover according to claim 18, wherein said upper securing mechanism is a hook and loop fastener strip.

20. A cover according to claim 18, wherein said upper securing mechanism includes a plurality of snap fasteners.

21. A cover according to claim 18, wherein said lower securing mechanism is a hook and loop fastener strip.

22. A cover according to claim 18, wherein said lower securing mechanism includes a plurality of snap fasteners.

23. A cover for a golf cart, the golf cart having a cart top and a passenger compartment, said cover comprising:
- a top portion overlaying the cart top, said top portion is made of a flexible material;
- a front portion including at least a driver side windshield panel and a passenger side windshield panel, said windshield panels are made of a flexible transparent material;
- a fastening mechanism connecting said windshield panels to each other at adjacent edges;
- wherein said fastening mechanism forms a substantially vertical connection in said front portion and is located in the approximate center of said front portion;
- a left side portion;
- a right side portion;
- wherein said front portion, said left side portion and said right side portion are connected to said top portion and extend downward to at least substantially cover the passenger compartment; and at least two straps connected to said cover, said straps having detachable attaching means for attaching said straps to said cover, whereby said passenger side windshield panel and said driver side windshield panel can be rolled toward the left and right sides of said front portion respectively, and said straps can surround said windshield panels and be attached to said cover preventing said windshield panels from unrolling.

24. A cover for a golf cart, the golf cart having a cart top and a passenger compartment, said cover comprising:
- a top portion overlaying the cart top, said top portion is made of a flexible material;
- a front portion including at least a driver side windshield panel and a passenger side windshield panel, said windshield panels are made of a flexible transparent material;
- a fastening mechanism connecting said windshield panels to each other at adjacent edges;
- wherein said fastening mechanism forms a substantially vertical connection in said front portion and is located in the approximate center of said front portion;
- a left side portion;
- a right side portion; and
- a connecting mechanism connecting said left side portion to said right side portion across the front of the golf cart;
- wherein said front portion, said left side portion and said right side portion are connected to said top portion and extend downward to at least substantially cover the passenger compartment.

25. A cover according to claim 24, wherein said connecting mechanism is an elastic cord.

26. A cover for a golf cart, the golf cart having a cart top and a passenger compartment, said cover comprising:
- a top portion overlaying the cart top, said top portion is made of a flexible material;
- a front portion including a windshield panel, said windshield panel is made of a flexible transparent material and is connected to said front portion at a first vertical edge of said windshield panel;
- a fastening mechanism connecting said windshield panel to said front portion on a second vertical edge of said windshield panel opposite of said first vertical edge;
- wherein said fastening mechanism forms a substantially vertical connection in said front portion and is located near a side of said front portion;
- a rear portion;
- a left side portion; and
- a right side portion;
- wherein said front portion, said rear portion, said left side portion and said right side portion are connected to said top portion and extend downward from the perimeter of said top portion to at least substantially cover the passenger compartment.

27. A cover according to claim 26, wherein said fastening mechanism is a zipper.

28. A cover according to claim 26, wherein said fastening mechanism is a hook and loop fastener strip.

29. A cover according to claim 26, wherein said fastening mechanism includes a plurality of snap fasteners.

30. A cover for a golf cart, the golf cart having a cart top and a passenger compartment, said cover comprising:
- a top portion overlaying the cart top;
- a front portion including at least a driver side windshield panel and a passenger side windshield panel, said windshield panels are made of a flexible transparent material;
- a fastening means for connecting said windshield panels to each other at substantially vertical adjacent edges;
- wherein said fastening means is located in the approximate center of said front portion;
- a left side portion; and
- a right side portion;
- wherein said front portion, said left side portion and said right side portion are connected to said top portion and extend downward to at least substantially cover the passenger compartment.

31. A cover for a golf cart, the golf cart having a cart top and a passenger compartment, said cover comprising:
- a top portion overlaying the cart top, said top portion is made of a flexible material;
- a front portion including at least a driver side windshield panel and a passenger side windshield panel, said windshield panels are made of a flexible transparent material and are each connected to said front portion at least on one edge;
- a fastening means for connecting said windshield panels to each other at adjacent edges;
- wherein said fastening means forms a substantially vertical connection in said front portion and is located in the approximate center of said front portion;
- a rear portion;
- a left side portion; and
- a right side portion;
- wherein said front portion, said rear portion, said left side portion and said right side portion are connected to said top portion and extend downward from the perimeter of said top portion to at least substantially cover the passenger compartment.

32. A cover for a golf cart, the golf cart having a cart top and a passenger compartment, said cover comprising:
- a top portion overlaying the cart top, said top portion is made of a flexible material;
- a front portion including at least a driver side windshield panel, a passenger side windshield panel and a front panel, said windshield panels are made of a flexible transparent material and are each connected to said front portion at least on one edge, said front panel is made of a flexible material;
- a fastening means for connecting said windshield panels to each other at adjacent edges;
- wherein said fastening means forms a substantially vertical connection in said front portion and is located in the approximate center of said front portion;
- a rear portion;
- a left side portion; and
- a right side portion;
- wherein said front portion, said rear portion, said left side portion and said right side portion are made of flexible material and are connected to said top portion and extend downward from the perimeter of said top portion to at least substantially cover the passenger compartment;
- wherein said front panel is connected to said left side portion and said right side portion.

* * * * *